（12） United States Patent
Aaron et al.

(10) Patent No.: US 8,427,521 B2
(45) Date of Patent: Apr. 23, 2013

(54) METHOD AND APPARATUS FOR PROVIDING A COLLABORATIVE WORKSPACE

(75) Inventors: Jeffrey A. Aaron, Atlanta, GA (US); Larry Woodring, Decatur, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 815 days.

(21) Appl. No.: 12/603,476

(22) Filed: Oct. 21, 2009

(65) Prior Publication Data
US 2011/0090301 A1    Apr. 21, 2011

(51) Int. Cl.
*H04N 7/15* (2006.01)

(52) U.S. Cl.
USPC .................................. 348/14.08; 348/14.09

(58) Field of Classification Search ............... 348/14.08, 348/14.09; 370/260, 261
See application file for complete search history.

(56) References Cited

U.S. PATENT DOCUMENTS

| | | | |
|---|---|---|---|
| 6,330,022 B1 * | 12/2001 | Seligmann | 348/14.08 |
| 7,756,923 B2 * | 7/2010 | Caspi et al. | 348/14.08 |

* cited by examiner

*Primary Examiner* — Stella Woo

(57) ABSTRACT

A method and apparatus for providing collaborative workspace are disclosed. The method receives a request to establish a video conference for two or more participants, and obtains information from historical information on the two or more participants to be used with the collaborative workspace. The method determines preferences for each of the two or more participants as to a presentation of the collaborative workspace. The method receives one or more live images of the two or more participants and presents the collaborative workspace to each of the two or more participants in accordance with the preferences for each of the two or more participants.

14 Claims, 5 Drawing Sheets

METHOD AND APPARATUS FOR PROVIDING A COLLABORATIVE WORKSPACE

The present invention relates generally to communication networks and, more particularly, to a method and apparatus for providing collaborative workspace via a network, e.g., a video conferencing system for multiple participants.

BACKGROUND OF THE INVENTION

As the prevalence of communications over the Internet continues to grow, more and more businesses are reaching and connecting customers, remote employees, consultants, vendors, partners, and the like from locations farther than they are able to or desire to physically visit. For example, a business may expand based on Internet sales as opposed to establishing local sales outlets at various locations. Thus, communications between the businesses and customers etc. may then be conducted via a video conferencing system.

For example, a video conference can be setup for a plurality of attendants who are located at various meeting locations while images of the participants are captured by one or more cameras. The images from the various cameras can be projected on a monitor at each viewing location. For example, if the meeting is between two locations, each location has a camera and a monitor. The images may then be shown as split screens (e.g., half of the screen for images captured at each of the locations) on the monitors at the two locations. However, the video conferencing system may lack many elements of a live meeting. For example, a participant may not be aware of other participant's interest level, other participant's tendencies, organizational hierarchy, etc.

SUMMARY OF THE INVENTION

In one embodiment, the present invention discloses a method and apparatus for providing a collaborative workspace. The method receives a request to establish a video conference for two or more participants, and obtains information from historical information on the two or more participants to be used with the collaborative workspace. The method determines preferences for each of the two or more participants as to a presentation of the collaborative workspace. The method receives one or more live images of the two or more participants and presents the collaborative workspace to each of the two or more participants in accordance with the preferences for each of the two or more participants.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention broadly discloses a method and apparatus for providing a collaborative workspace via a network, e.g., a video conferencing system. Although the present invention is discussed below in the context of packet networks, e.g., Internet Protocol (IP) networks, the present invention is not so limited. Namely, the present invention can be applied to other networks, e.g., IP Multimedia Subsystem (IMS) networks, wireless networks, cellular networks and the like.

Figure 1:
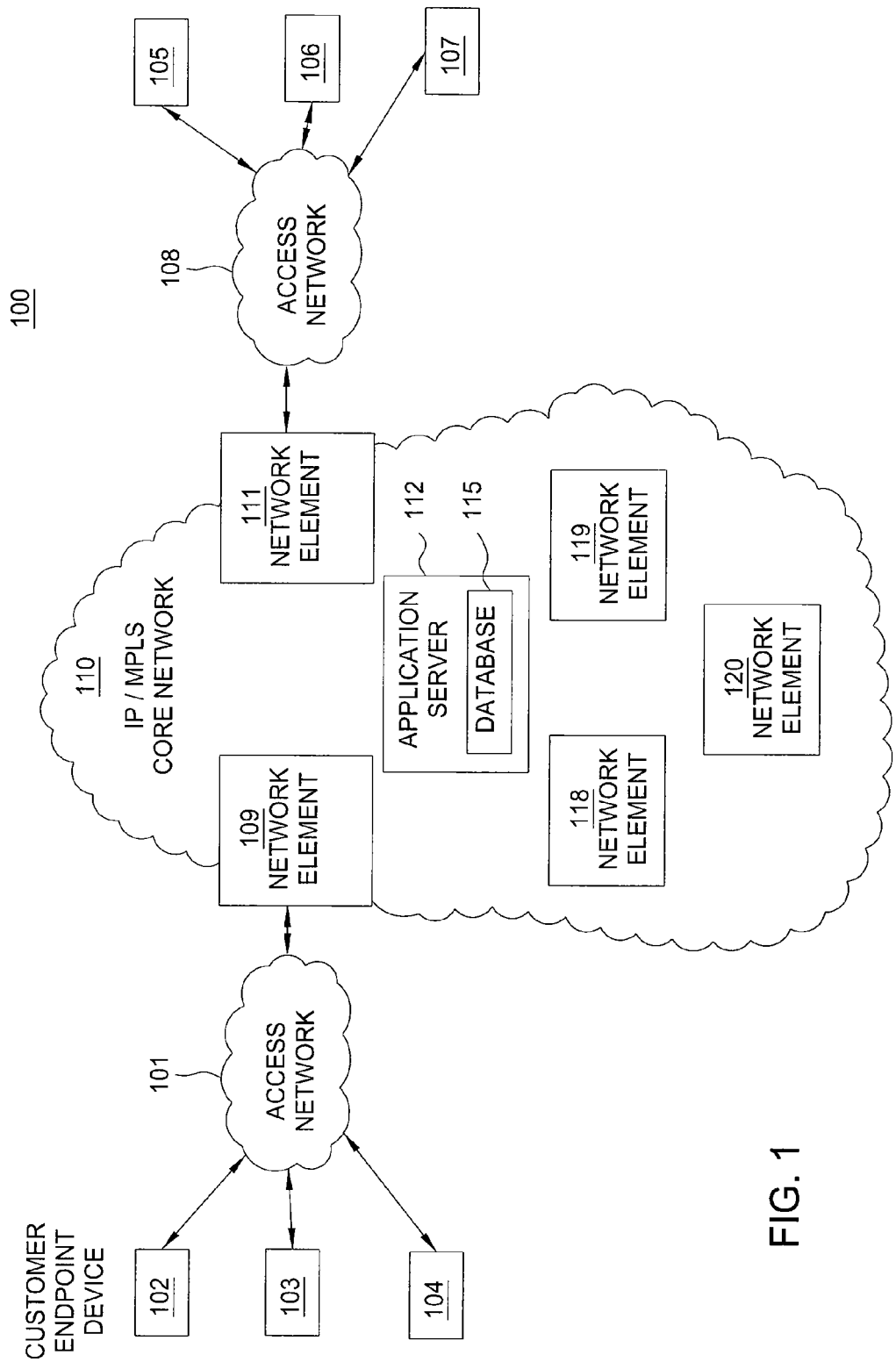
FIG. 1 illustrates an exemplary network related to the present invention.

FIG. 1 is a block diagram depicting an exemplary packet network 100 related to the current invention. Exemplary packet networks include Internet protocol (IP) networks, Asynchronous Transfer Mode (ATM) networks, frame-relay networks, virtual networks (e.g., VLAN/Virtual Local Access Network, VPN/Virtual Private Network, etc.), Multi-Protocol Label Switching (MPLS) networks, and the like. An IP network is broadly defined as a network that uses Internet Protocol such as IPv4 or IPv6 and the like to exchange data packets.

In one embodiment, the packet network may comprise a plurality of endpoint devices 102-104 configured for communication with the core packet network 110 (e.g., an IP based core backbone network supported by a service provider) via an access network 101. Similarly, a plurality of endpoint devices 105-107 are configured for communication with the core packet network 110 via an access network 108. The network elements 109 and 111 may serve as gateway servers or edge routers for the network 110. The gateway servers may also be referred to as border elements.

The endpoint devices 102-107 may comprise customer endpoint devices such as personal computers, laptop computers, netbook computers, Personal Digital Assistants (PDAs), mobile phones, smart phones, STBs (Set top Boxes, terminals, servers, routers, and the like. The access networks 101 and 108 serve as an access conduit to establish a connection between the endpoint devices 102-107 and the NEs 109 and 111 of the core network, e.g., an IP/Multiprotocol Label Switching (MPLS) core network 110. The access networks 101 and 108 may each comprise a Digital Subscriber Line (DSL) network, a broadband cable access network, a Local Area Network (LAN), a Wireless Access Network (WAN), a $3^{rd}$ party network, and the like. The access networks 101 and 108 are connected to NEs 109 and 111 of the core network 110. The packets from customer endpoint devices 102-104 (traveling towards the IP/MPLS core network 110) traverse the access network 101 to reach the border element 109. The packets from customer endpoint devices 105-107 (traveling towards the IP/MPLS core network 110) traverse the access network 108 to reach the border element 111.

Some NEs (e.g., NEs 109 and 111) reside at the edge of the core infrastructure and interface with customer endpoints over various types of access networks. An NE that resides at the edge of a core infrastructure is typically implemented as an edge router, a media gateway, a border element, a firewall, a switch, a call control element, and the like. An NE may also reside within the network (e.g., NEs 118-120) and may be used as a mail server, a honeypot, a router, or like device. The IP/MPLS core network 110 also comprises an application server 112 that contains a database 115. The application server 112 may comprise any server or computer that is well known in the art, and the database 115 may be any type of electronic collection of data that is also well known in the art. Those skilled in the art will realize that although only six endpoint devices, two access networks, and so on are depicted in FIG. 1, the communication system 100 may be expanded by including additional endpoint devices, access networks, border elements, etc. without altering the scope of the present invention.

The above IP network is only described to provide an illustrative environment in which packets for video, voice and data services are transmitted on networks. A customer may setup a video conference to be attended by participants dispersed at various locations. Images (e.g., video) from each of the various locations can be shown on a monitor. For example, if there are four locations, the images from each location can be shown on a quarter of a single large monitor, or via a plurality of monitors.

However, the video conference on a typical system lacks many elements of a live meeting. For example, unlike in a live meeting, a participant may not be able to determine each participant's interest level, tendency, role in the meeting, etc. In addition, the video conference may lack enhancements for improving the experience for each participant. For example, a participant simply views the images from the other locations while listening to a speaker. However, the participant may wish to customize the images, receive biography of speakers, etc. Furthermore, different participants may have different preferences for the type of enhancement and experience.

In one embodiment, the current invention provides a collaborative workspace via a network that simulates and enhances the experience of a live (face-to-face) meeting. For example, the method may provide a video conference that better simulates a live meeting.

The method first gathers historical or profile information on the conference participants (or invitees) that is relatively static pertaining to the participants. It should be noted that the terms "participant" and "invitee" are generally used interchangeably throughout the present disclosure. However, under certain scenarios as discussed below, an invitee who does not participate in the video conference will not be considered as a participant, whereas an invitee who subsequently joins the video conference will be deemed a participant. For example, the method may receive a request for a meeting with a list of potential participants. The method may then retrieve from one or more databases historical or profile information for each participant.

In one embodiment, the retrieved historical information may comprise one or more of: preferences of a participant, hobbies of a participant, known affiliations and/or roles/titles of a participant (e.g., a stakeholder, a member of the audience, a speaker, a facilitator, a supervisor, an executive, a head of a particular department or group, a consultant, a representative of an organization/company, etc.), prior tendencies (e.g., a participant who has a strong interest level to certain issues or subjects, a champion and/or responsible person for a particular area, a particular voting pattern, mood, etc.), conference participation level (e.g., very active, generally active, generally non-active, or non-active), personal traits (e.g., prefers to use charts and tables, prefers to ask questions, prefers to ask for support to substantiate an answer, prefers to defer to a superior's opinion and so on), interest level (e.g., a high interest level, a neutral interest level, a low interest level, etc.), and so on. This historical information can be gathered and stored over a period of time by inputs provided by each of the participants, or extracted from inputs provided by other participants for a particular participant. For example, a first participant may provide his or her title in a company, and perhaps his interest areas, whereas a second participant may indicate that the first participant is a very active participant and so on.

The method may then process the gathered historical information. For example, the method may identify and store pertinent information that will be useable for the collaborative workspace. For example, information can be sorted for display, e.g., displaying a list of stakeholders who are currently participating on the video conference, displaying a list of voting and non-voting participants (e.g., for conferences which include voting), displaying a list of previous voting patterns for the participants and so on. For example, if multiple participants from the same organization or workgroup are attending the meeting, a vote by the leader of the workgroup (e.g., a supervisor) will provide important insights to other participants on the video conference as compared to votes from the other participants from the same workgroup.

During the video conference, one or more live images will be captured via a plurality of cameras. For example, the method may capture images of participants using video cameras at the various participant locations. In one embodiment, the images from the one or more video cameras are received and processed by an application server located in the service provider's network.

In one embodiment, the method may also generate synthetic imagery for the collaborative workspace for each participant. For example, a participant may have chosen to use an avatar (e.g., a synthetically generated character) as an image to be displayed on the monitor instead of his/her image that is captured via the video camera. This overlay function can be employed if a participant who is actually present at one of the locations wants to remain anonymous (e.g., a witness, a potential buyer, a sub-contractor, an informant, and so on) and/or if a live video image is not available for whatever reason. In another example, a participant may simply choose to display his/her company logo instead of the captured live image. It should be noted that the overlay function can be implemented as a complete overlay (i.e., the participant's image is completely covered) or it can be implemented partially as an enhancement (i.e., the participant's image is not completely covered, e.g., showing a company logo below the image of the participant without blocking the face of the participant). Thus, a participant being viewed can set certain criteria that will affect how he or she will be perceived by other participants.

In one embodiment, the method determines modifications based on criteria determined by a viewing participant. For example, a participant may have filtering rules such as viewing only active participants, i.e., only the current speakers, etc. In another example, a participant may request images to be modified (e.g., add flags to be attached to certain participants as markers, e.g., to indicate an important participant and so on), background music or audio markers/flags to be added, and so on. Additionally, a blind participant may request that all visual indicators be translated to a synthetic voice which speaks the information to them (to the degree/extent desired and feasible). Thus, a participant who is viewing the video conference can set certain criteria that will affect how the video conference will be presented to the viewing participant, e.g. so as to be most useful to each individual participant.

In one embodiment, the method may perform tests to resolve any possible conflicts between two or more participants. For example, a participant may have chosen not to have his/her real image displayed and another participant may have chosen to participate only in conferences in which all participants have their real image displayed. The method may notify the host and/or participants regarding the conflict. The method may receive a rule salience for resolving the conflict. For example, a host of the video conference may override a participant's choice to hide his/her image, information, vote, etc. The method may then resolve the conflicts using the rule salience. It should be noted that conflict resolution can be implemented in any number of ways as agreed by the participants. For example, a host setting up the video conference may inform the invitees in advance of the conference as to what preferences will be allowed and what preferences will not be allowed. Alternatively, an invitee may inform the host as to what preferences must be allowed in order for the invitee to be willing to participate in the video conference and so on.

In one embodiment, the method then presents the collaborative workspace to each participant. Broadly, the collaborative workspace comprises a multimedia presentation that comprises one or more of: live video streams, audio streams, still images, or synthetically generated imagery, e.g., computer generated graphics and the like.

For example, a participant may have chosen to have background music during the video conference, with the captured live images in the various locations modified to indicate logos of represented organizations/companies. However, at another location, a participant in the same video conference may have chosen to view only the speaker's image, whereas all other participants' live images are replaced by avatars, etc. Thus, each participant may then attend the video conference with his/her preferred criteria implemented through a media server. Thus, each participant of the same video conference is presented with a different collaborative workspace that is tailored to the specific requirements of a particular viewing participant or a group of viewing participants.

In one embodiment, the method gathers dynamic information during the video conference. The dynamic information is processed to dynamically modify the experience for each viewing participant. In one embodiment, the dynamic information may comprise one or more of: a change to one or more preferences, a change to one or more measures of interaction (e.g., active participation versus silence), a change in mood of a participant, a change in interest level of a participant, detecting voting information, and so on. The dynamic information can be gathered in a number of ways. For example, voting information can be gathered from inputs directly provided by the participants, e.g., via a web-based voting website, via a keypad and the like. Alternatively, the dynamic information can be gathered indirectly, e.g., measuring the tone of a speaking participant, detecting words used by a speaking participant, detecting gestures used by a speaker, and so on.

In one embodiment, the method is capable of detecting "body language". In other words, the present invention is capable of detecting gestures such as a participant moving an arm, a participant moving a hand, a participant moving his or her head, and so on. For example, image segmentation technique can be employed to detect various body parts, e.g., using skin tone detection as a method to determine various body parts. Once properly categorized, the method can track the movement of these body parts. It should be noted that any method of analyzing body language can be used in conjunction with the present invention.

In one embodiment, the method may then process the dynamic information and provide dynamic enhancements to the presented images. For example, if a lack of interest by a participant is detected, the participant's image and/or avatar may be modifying to show the lack of interest, e.g., show a sleeping icon (e.g., a string of the letter "z") next to the participant, etc. If it is detected that a participant is generally in agreement with a topic or issue that is currently being discussed, then the image may be shown with an agreement icon (e.g., a thumbs-up icon or a head moving up and down to gesture agreement, etc). Alternatively, if it is detected that a participant is generally in disagreement with a topic or issue that is currently being discussed, then the image may be shown with a disagreement icon (e.g., a thumbs-down icon or a head moving left and right to gesture disagreement, etc).

The dynamic enhancements can be automatically presented by using a computer algorithm designed to automatically detect various dynamic parameters as discussed above (such as tone, volume, words/keywords used, gestures, direct inputs from the participants and so on). Alternatively, the dynamic enhancements can be manually presented due to the inputs of a host or a designated participant. For example, a host may be tasked with moving the video conference along due to time constraints. As such, the host may manually assign an icon next to each participant so that all participants can see the progress or the lack of progress on a particular topic. For example, if a current speaking participant or a facilitator of the current topic detects that most of the participants are shown as being uninterested, then the video conference can be sped up by moving on to the next topic. In another example, if most of the participants are gesturing agreement, then a host may deem that it is timely to ask that a vote be conducted for a particular topic.

In one embodiment, the method may also perform annotated archiving. Annotated archiving refers to the processing of the contents from the video conference to generate a conference summary prior to storing the information, e.g., storing a copy of the entire video conference. For example, the method may summarize conference points and highlights, assign weights for each of the conference points and highlights (e.g., more weight for pertinent conference points and highlights, and less weight for non-pertinent conference points and highlights) and then store the information. A viewer may then retrieve and view the conference summary from the archive to ascertain whether the stored video conference is of interest, instead of having to view the entire video conference. For example, a stakeholder who was unable to attend the video conference may be able to make a decision as to whether to spend the time to view the stored video conference, by simply viewing the conference summary. In one embodiment, the conference summary may further include an actual clip from the video conference, e.g., a clip where a vote was tallied for a particular issue.

Figure 2:
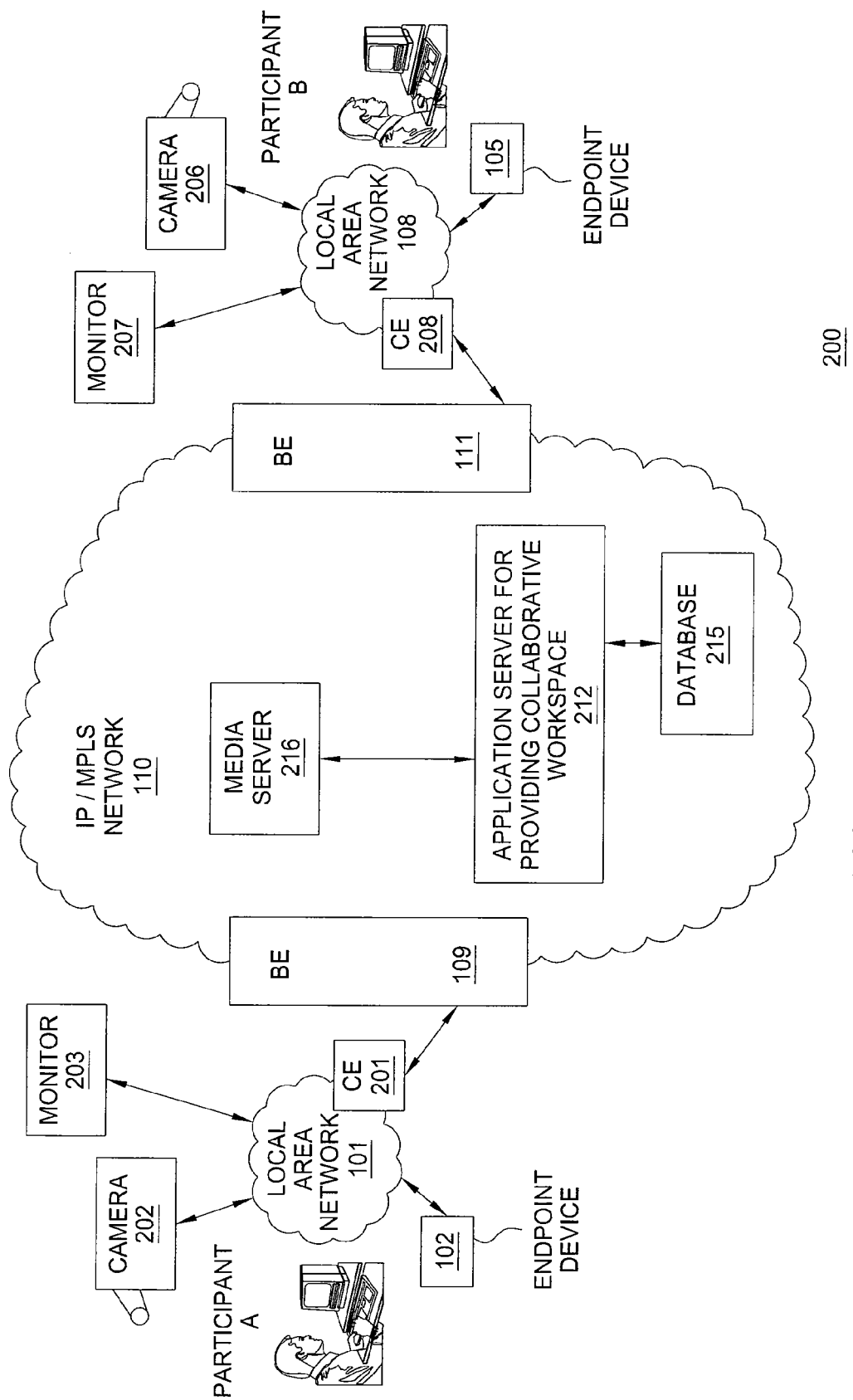
FIG. 2 illustrates an exemplary network for providing collaborative workspace.

FIG. 2 illustrates an exemplary network 200 for providing a collaborative workspace, e.g., via one or more networks. For example, a video conference may be provided for participants (or invitees) A and B. The collaborative workspace is provided over an IP/MPLS network 110. The IP/MPLS network 110 comprises border elements 109 and 111, a media server 216, an application server for providing collaborative workspace (e.g. a video conference) 212 and a database 215. Participant A uses the customer endpoint device 102 to access the collaborative workspace via a customer edge router 201 located in a local area network 101. Similarly, participant B uses the customer endpoint device 105 to access the collaborative workspace via a customer edge router 208 located in a local area network 108. The customer edge routers 201 and 208 are connected to the IP/MPLS network 110 via border elements 109 and 111, respectively.

The participant A's location also has devices to be used for the collaborative workspace comprising a camera 202 and a monitor 203. Images of participant A are captured via camera 202 and transmitted to the application server 212 located in the IP/MPLS network 110 via the local area network 101. Similarly, the content of the collaborative workspace is presented to participant A using the monitor 203 and the endpoint device 102.

The participant B's location also has devices to be used for collaborative workspace comprising a camera 206 and a monitor 207. Images of participant B are captured via camera 206 and transmitted to the application server 212 located in IP/MPLS network 110 via the local area network 108. Similarly, the content of the collaborative workspace is presented to participant B using the monitor 207 and the endpoint device 105.

In one embodiment, the application server 212 first receives a request to establish a video conference, thereby providing a collaborative workspace for invitees in multiple locations, e.g., locations of invitees A and B. The method then gathers historical information on the invitees A and B. For example, the method may retrieve from database 215 historical information for the invitees A and B.

In one embodiment, the retrieved historical information for the invitees A and B may comprise their preferences, known affiliations and roles/titles, prior tendencies, participation level, personal traits, interest level, and so on. The method may then process the retrieved historical information to identify and store pertinent information that will be useful for presenting the collaborative workspace to the invitees. For example, invitee A may have a preference to have his/her image replaced by an avatar.

The method may then perform tests to resolve any possible conflicts among the invitees. For the above example, invitee A may have chosen to have his/her image replaced by an avatar while invitee B may have chosen to participate only in video conferences in which all participants are shown with their live images (e.g., as captured via a camera). For example, the method may notify both invitees A and B regarding the conflict before the setup of the video conference. The method may receive a rule salience for resolving the conflict. For example, invitee B may relent and changes his/her preference to proceed with the video conference by allowing invitee A's image to be replaced by an avatar. For example, invitee A may be a potential buyer who wants to remain anonymous. In another example, invitee B may also change his/her preference to also replace his/her own image with an avatar in light of the conflict. In this manner, the application server 212 is able to resolve any potential conflicts. Although the invitees themselves can be given a choice to resolve the potential conflict in one embodiment, the present invention is not so limited. Alternatively, the host of the video conference can simply define a set of criteria for the video conference, where the host's defined criteria will override any preferences of any of the invitees that may result in a conflict, with optional configurable notifications being sent to the affected invitees. Alternatively, any invitees who have conflicting preferences will be informed of the conflicts, such that the invitees will not be allowed onto the video conference unless they are willing to alter their preferences to conform with the host's defined criteria.

The method then captures one or more live images, or retrieves or generates the pertinent imagery such as avatars. For example, the method may capture images of participants A and B using the video cameras 202 and 206. The images from the video cameras may then be received and processed by the application server 212. The method may also generate synthetic imagery for the collaborative workspace for each participant. For the above example, participant A's image may be replaced by his/her preferred avatar as previously defined and stored in the database 215. The method then determines modifications for each viewing participant based on criteria determined by the viewing participant(s). For example, the participant B may have a preference to modify images of other participants by adding a flag, to insert an audio stream during the video conference as background music, and so on. The implementation of these preferences can be performed with the assistance of the media server 216.

The method then presents the collaborative workspace to each participant. For example, participants A and B may receive the images and audio content in accordance with their preferences and modifications.

The method then gathers dynamic information during the video conference. For example, if a change in participant A's mood is detected, the image presented on monitor 207 to participant B may be modified to indicate the change in participant A's mood. For example, participant A may have uttered words or used tones that indicate that participant A is becoming irritated such that participant B is presented with participant A's avatar having a displeased expression. Participant B may then use the information to speed up the conversation, or to simply skip to another topic, etc.

In one embodiment, once the video conference is concluded, the method also performs annotated archiving. For example, the method may summarize the video conference between participants A and B to generate a conference summary. A viewer may then retrieve and view the conference summary from the archive rather than having to watch the entire video. For example, a supervisor or a third party who was unable to attend the video conference may be able to make a decision based on viewing the conference summary. In one embodiment, the content of the conference summary may be based on the dynamic information gathered automatically during the meeting, e.g., the automated system may incorporate a voting event into the conference summary. In another embodiment, the content of the conference summary may be based on information provided directly by the participants, e.g., the host, when the video conference concludes. For example, the host may annotate the conference summary with a brief description and/or by inserting a clip of the video conference into the conference summary. For example, the host may have the ability to signal to the application server 212 at a particular important point during the video conference. For example, when the participant A indicates a willingness to agree to the terms of a contract, the host (e.g., participant B) may indicate to the application server 212 to mark that portion of the video conference. At the conclusion of the video conference, the clip showing participant A agreeing to the contract terms can be inserted into the conference summary. This will allow the supervisor or the third party to simply view the conference summary to quickly see that participant A did indeed accepted the contract terms during the video conference.

In one embodiment, the annotations may include speech-to-text such that a text-only transcript can be produced. Furthermore, the annotations may include additional information indicating gestures or actions taken by the participants, e.g., "participant A is nodding", "participant B left the room", and the like.

It should be noted that the networks, the participant premise equipment and the various scenarios discussed above are only illustrative. In other words, the physical networks and the various hardware components necessary to provide the collaborative workspace as discussed in the present disclosure can be implemented using other network architectures with different network components.

In one alternate embodiment, a foreign language translator can be implemented to translate speech uttered in a different language. For example, a participant who speaks a different language from the "common" language that is set for the conference can be assisted by an automated foreign language translator (e.g., a speech to text translation followed by a language translation into a different language and so on). In other words, a participant who only speaks Spanish and is participating in an "English" conference will indicate to the system that he or she will need the assistance of a foreign language translator. In response, the system will translate speech spoken by the Spanish participant into English and vice versa with respect to speech uttered by other English speaking participants. The system may optionally present the detected speech to the participant who spoke in a foreign language, e.g., in Spanish, before it is translated and presented to the other participants, e.g., in English. For example, the system may present the following statement to the participant who spoke in Spanish, "Did you say 'I want to ask a question.'" If the participant responds affirmatively, the system will translate and present the statement into English.

Figure 3:
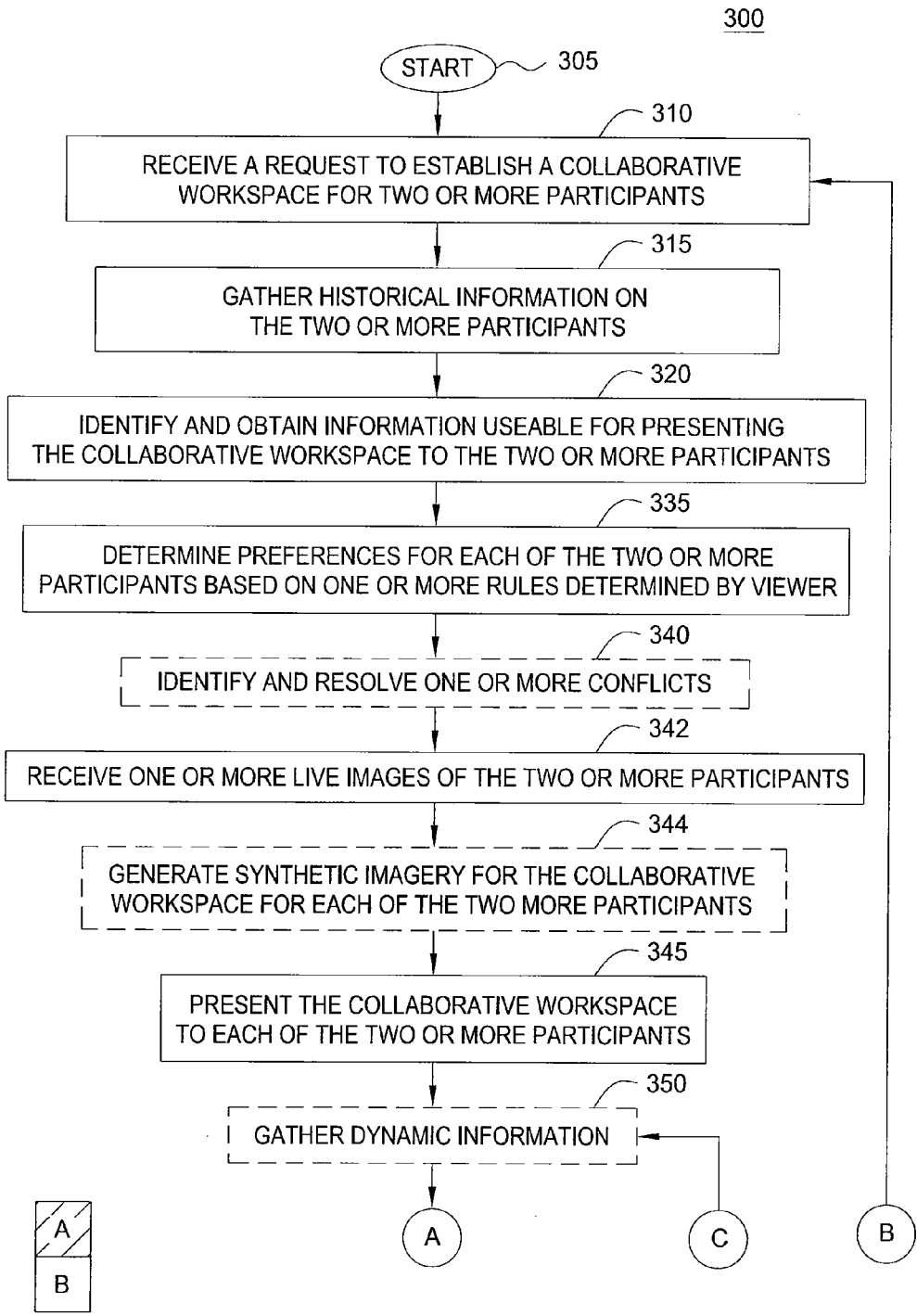
FIG. 3 illustrates a flowchart of a method for providing collaborative workspace.
Figure 3:
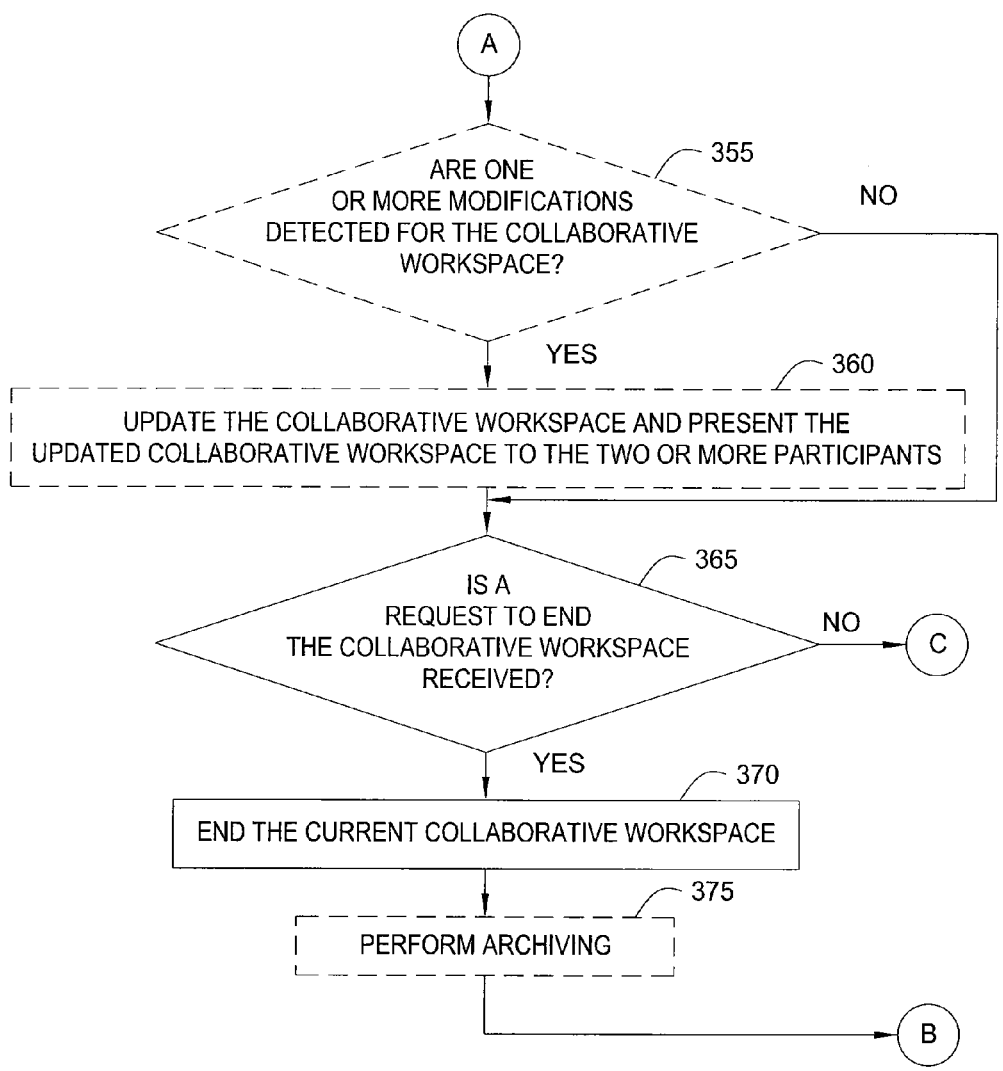

FIG. 3 illustrates a flowchart of a method 300 for providing a collaborative workspace via a video conference. For example, method 300 can be implemented by one or more application servers. Method 300 starts in step 305 and proceeds to step 310.

In step 310, method 300 receives a request to establish a collaborative workspace for two or more participants. For example, the method may receive a request for establishing a video conference among participants located in two or more locations.

In step 315, method 300 gathers historical or profile information on the two or more participants. For example, the method may retrieve historical information from a database for the two or more participants.

In step 320, method 300 identifies and obtains information that is deemed useful for use in the collaborative workspace to be presented to the two or more participants. For example, the method may process the gathered historical information to identify and store a portion of the gathered information with a server that is tasked with presenting the collaborative workspace to the participants.

In step 335, method 300 determines preferences for each of the two or more participants based on one or more rules determined by each of the participants. For example, a participant may have a rule that modifies images of other participants by adding a flag, a company logo, etc. Another participant may have a rule that enables the participant to listen to background music or to a synthesized voice (e.g., presenting graphical information translated into a vocal track) while participating in a video conference. For example, the background music may be added to the audio portion of the video conference only for that particular viewing participant with such rule.

In an optional step 340, method 300 identifies and resolves one or more potential conflicts among rules of two or more participants. For example, a first participant may have chosen to have his/her image replaced by an avatar while a second participant may have chosen to be on the video conference only if all participants are willing to show their faces (e.g., as captured via a camera). In one embodiment, the method may then notify the first and second participants regarding the potential conflict and subsequently receives a rule salience for resolving the conflict. For example, one of the participants may change his/her preference to resolve the conflict. In turn, the method may then resolve the conflict based on the change. However, it should be noted that the present invention is not limited to this conflict resolution method and that any method of conflict resolution can be implemented at this stage.

In step 342, method 300 receives one or more live images of the two or more participants. For example, the method may use cameras in the participant locations to capture images of the one or more participants. The images may then be sent to an application server for providing the collaborative workspace.

In an optional step 342, method 300 generates or obtains a synthetic imagery for the collaborative workspace for the two or more participants. For example, a participant's preference may have defined that an avatar be used to replace his/her image. The method then generates or obtains the avatar (e.g., previously stored in a database) in accordance with the participant's preference. In turn, the identified avatar is also presented to the application server that is providing the collaborative workspace to all the participants.

In step 345, method 300 presents the collaborative workspace to each of the two or more participants. For example, each of the participants may receive the images (e.g., live and/or synthetic) and audio content in accordance with their preferences and/or modifications.

In optional step 350, method 300 gathers dynamic information. For example, the method may gather dynamic information that will reflect changes in moods or interests of the one or more participants, feedback or input from the participants, and the like, during the video conference.

In optional step 355, method 300 determines if modifications are detected for the collaborative workspace. For example, the method may process the dynamic information to determine if any modifications are to be made to collaborative workspace that will be presented to the participants. For example, a change in a first participant's mood may be detected. For example, the first participant may be bored. If one or more modifications are detected, then the method proceeds to optional step 360. Otherwise, the method proceeds to step 365.

In optional step 360, method 300 updates the collaborative workspace and presents the updated collaborative workspace to the two or more participants. For the above example, the image of the first participant presented to a second participant may be modified to indicate the change in the first participant's mood. For example, the image of the first participant presented on a monitor to the second participant may then be shown with an icon to indicate boredom.

In step 365, method 300 determines if a request to end the collaborative workspace (i.e., the current video conference) is received. For example, the method may receive a request to end the video conference from the host, or a request may be generated automatically when all the conference participants disconnect/leave the conference. If a request to end the collaborative workspace is received, then the method proceeds to step 370. Otherwise, the method proceeds to step 350.

In step 370, method 300 ends the current collaborative workspace. For example, the method may have received a request to terminate a video conference. The method then terminates the video conference in accordance with the request, where in one embodiment a copy of the video conference is saved.

In an optional step 375, method 300 performs annotated archiving. For example, the method may process the voice, data and/or images from the video conference to generate a conference summary. For example, the video conference can be divided into various segments or clips. The conference summary may comprise annotations provided by one or more participants and may optionally include one or more of the clips from the recorded video conference. The method then proceeds to step 310 to continue receiving requests.

It should be noted that although not specifically specified, one or more steps of method 300 may include a storing, displaying and/or outputting step as required for a particular application. In other words, any data, records, fields, and/or intermediate results discussed in the method can be stored, displayed and/or outputted to another device as required for a particular application. Furthermore, steps or blocks in FIG. 3 that recite a determining operation or involve a decision, do not necessarily require that both branches of the determining operation be practiced. In other words, one of the branches of the determining operation can be deemed as an optional step.

Figure 4:
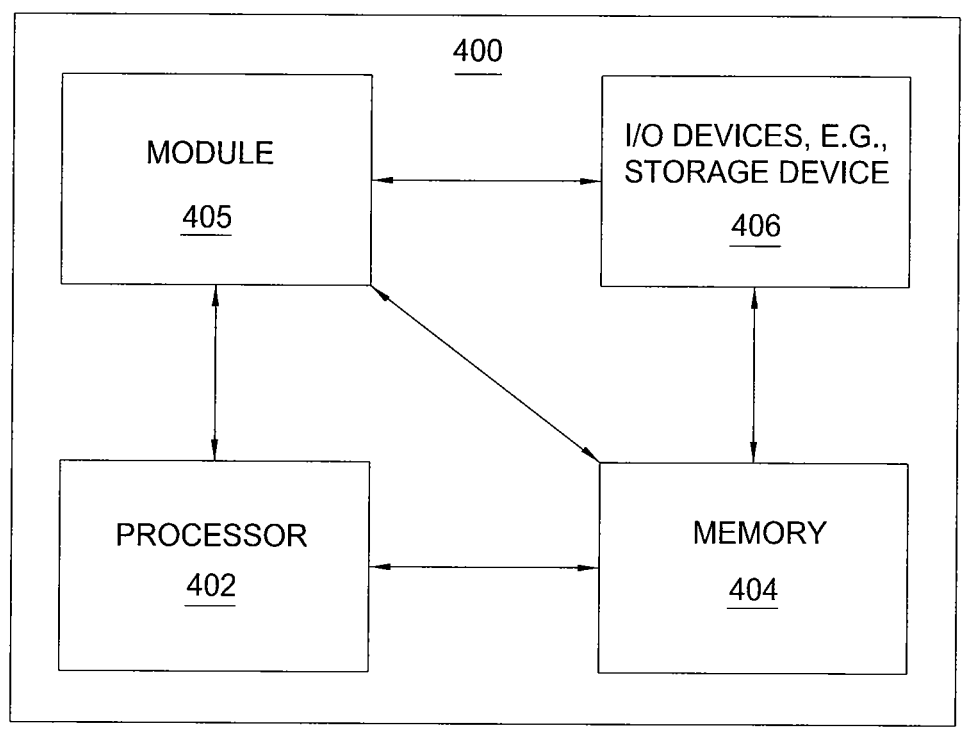
FIG. 4 illustrates a high-level block diagram of a general-purpose computer suitable for use in performing the functions described herein.

FIG. 4 depicts a high-level block diagram of a general-purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for providing a collaborative workspace, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 405 for providing a collaborative workspace can be loaded into memory 404 and executed by processor 402 to implement the functions as discussed above. As such, the present method 405 for providing a collaborative workspace (including associated data structures) of the present invention can be stored on a computer readable storage medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for providing a collaborative workspace, comprising:
   receiving, by a processor, a request to establish a video conference for a plurality of participants;
   obtaining, by the processor, information from historical information on the plurality of participants to be used with the collaborative workspace;
   determining, by the processor, a preference for each of the plurality of participants as to a presentation of the collaborative workspace;
   receiving, by the processor, live images of the plurality of participants;
   presenting, by the processor, the collaborative workspace to each of the plurality of participants in accordance with the preference for each of the plurality of participants;
   identifying, by the processor, a conflict due to the preference for each of the plurality of participants; and
   resolving, by the processor, the conflict, wherein the resolving the conflict comprises:
      sending a notice of the conflict to the plurality of participants; and
      receiving a request from one of the participants to change a respective preference.

2. The method of claim 1, further comprising:
   generating a synthetic imagery for the collaborative workspace associated with one of the plurality of participants.

3. The method of claim 2, wherein the synthetic imagery is used in conjunction with the live images of the plurality of participants.

4. The method of claim 2, wherein the synthetic imagery is used in place of one of the live images of one of the plurality of participants.

5. The method of claim 1, further comprising:
   gathering dynamic information from the video conference;
   determining if a modification to the collaborative workspace is necessary from the dynamic information; and
   updating the collaborative workspace if it is determined that the modification to the collaborative workspace is necessary.

6. The method of claim 1, further comprising:
   receiving a request to end the video conference; and
   saving a copy of the video conference.

7. The method of claim 1, further comprising:
   generating a conference summary for the video conference.

8. The method of claim 7, wherein the conference summary contains a clip taken from the video conference.

9. A method for providing a collaborative workspace, comprising:
   receiving, by a processor, a request to establish a video conference for a plurality of participants;
   obtaining, by the processor, information from historical information on the plurality of participants to be used with the collaborative workspace;
   determining, by the processor, a preference for each of the plurality of participants as to a presentation of the collaborative workspace;
   receiving, by the processor, live images of the plurality of participants;
   presenting, by the processor, the collaborative workspace to each of the plurality of participants in accordance with the preference for each of the plurality of participants;
   identifying, by the processor, a conflict due to the preference for each of the plurality of participants; and
   resolving, by the processor, the conflict, wherein the resolving the conflict comprises:
      sending a notice of the conflict to the plurality of participants informing each of the plurality of participants that compliance with a preference of a host participant is required; and
      wherein the collaborative workspace is presented to participants of the plurality of participants having preferences that are not in conflict with the preference of the host participant.

10. A tangible computer-readable storage medium storing a plurality of instructions which, when executed by a processor, cause the processor to perform operations for providing a collaborative workspace, the operations comprising:
    receiving a request to establish a video conference for a plurality of participants;
    obtaining information from historical information on the plurality of participants to be used with the collaborative workspace;
    determining a preference for each of the plurality of participants as to a presentation of the collaborative workspace;
    receiving live images of the plurality of participants;
    presenting the collaborative workspace to each of the plurality of participants in accordance with the preference for each of the plurality of participants;
    identifying a conflict due to the preference for each of the plurality of participants; and
    resolving the conflict, wherein the resolvinq the conflict comprises:
       sending a notice of the conflict to the plurality of participants; and
       receiving a request from one of the plurality of participants to change a respective preference.

11. The tangible computer-readable storage medium of claim 10, further comprising:

generating a synthetic imagery for the collaborative workspace associated with one of the plurality of participants.

12. The tangible computer-readable storage medium of claim 11, wherein the synthetic imagery is used in conjunction with one of the live images of one of the plurality of participants.

13. The tangible computer-readable storage medium of claim 11, wherein the synthetic imagery is used in place of one of the live images of one of the plurality of participants.

14. The tangible computer-readable storage medium of claim 10, further comprising:

gathering dynamic information from the video conference;

determining if a modification to the collaborative workspace is necessary from the dynamic information; and updating the collaborative workspace if it is determined that the modification to the collaborative workspace is necessary.

* * * * *